United States Patent
Berry et al.

(10) Patent No.: US 9,697,095 B2
(45) Date of Patent: Jul. 4, 2017

(54) SWITCH FAILURE RECOVERY SYSTEM

(71) Applicant: Dell Products L.P., Round Rock, TX (US)

(72) Inventors: Andrew Berry, Austin, TX (US); Craig Warren Phelps, Austin, TX (US); Deborah C. Russell, Austin, TX (US)

(73) Assignee: Dell Products L.P., Round Rock, TX (US)

(*) Notice: Subject to any disclaimer, the term of this patent is extended or adjusted under 35 U.S.C. 154(b) by 119 days.

(21) Appl. No.: 14/575,899

(22) Filed: Dec. 18, 2014

(65) Prior Publication Data
US 2016/0179638 A1 Jun. 23, 2016

(51) Int. Cl.
G06F 11/20 (2006.01)
G06F 11/07 (2006.01)
G06F 11/14 (2006.01)
G06F 11/30 (2006.01)

(52) U.S. Cl.
CPC ...... G06F 11/2005 (2013.01); G06F 11/0751 (2013.01); G06F 11/1438 (2013.01); G06F 11/1458 (2013.01); G06F 11/1464 (2013.01); G06F 11/2015 (2013.01); G06F 11/3031 (2013.01); G06F 11/3058 (2013.01)

(58) Field of Classification Search
CPC ............ G06F 11/2005; G06F 11/2007; G06F 11/2097; G06F 11/2025; G06F 11/2038; H04L 43/0811; H04L 49/351; H04L 49/552; H04L 41/0816; H04L 41/0672
See application file for complete search history.

(56) References Cited

U.S. PATENT DOCUMENTS

| | | | |
|---|---|---|---|
| 6,597,073 B1 * | 7/2003 | Check | G06F 1/30 307/130 |
| 7,043,485 B2 | 5/2006 | Manley et al. | |
| 7,469,279 B1 * | 12/2008 | Stamler | H04L 41/0672 709/220 |
| 7,483,370 B1 * | 1/2009 | Dayal | G06F 11/2038 370/219 |

(Continued)

OTHER PUBLICATIONS

"Configuring Dying Gasp", Chapter 4, Cisco Connected Grid Switch Software Configuration Guide, Cisco IOS Release 15.0(2)ED, p. 4-1 to p. 4-4.

(Continued)

*Primary Examiner* — Nadeem Iqbal
(74) *Attorney, Agent, or Firm* — Haynes and Boone, LLP

(57) ABSTRACT

A switch failure recovery system includes a network and a backup device that is coupled to the network. A first switch that includes a first switch memory system is also coupled to the network. The first switch stores a first switch configuration in the first switch memory system. The first switch then detects a failure issue associated with an imminent failure of the first switch and, in response, retrieves the first switch configuration from the first switch memory system, The first switch then sends the first switch configuration over the network to the backup device prior to an inability to communicate over the network due to the failure issue. The backup device may then provide the first switch configuration for application to the first switch (upon recovery) or a second switch that is coupled to the network.

20 Claims, 5 Drawing Sheets

(56) References Cited

U.S. PATENT DOCUMENTS

| | | | | |
|---|---|---|---|---|
| 7,697,419 B1* | 4/2010 | Donthi | ............... | H04L 49/65 370/220 |
| 2010/0238945 A1* | 9/2010 | McKernan | ......... | H04L 12/4641 370/401 |
| 2013/0117516 A1* | 5/2013 | Sobolewski | ............ | G06F 12/16 711/162 |
| 2014/0064059 A1* | 3/2014 | Shin | ............... | H04L 41/0668 370/221 |
| 2014/0337562 A1* | 11/2014 | Long | ............... | G06F 3/0659 711/103 |
| 2015/0333952 A1* | 11/2015 | Chen | ............... | H04L 43/0811 370/242 |

OTHER PUBLICATIONS

"Your Network, Our Connection," Transition Networks, Service Provider Catalog 2012, pp. 1-130, http//www.connectdata.fr/files/documents/Transition/TN2012SP.pdf.

"EX3300 Ethernet Switch Entry-Level Access Switch With Virtual Chassis Technology," Juniper Networks, Datasheet; pp. 1-10, 2013, http://www.juniper.net/us/en/local/pdf/datasheets/1000389-en.pdf.

* cited by examiner

SWITCH FAILURE RECOVERY SYSTEM

BACKGROUND

The present disclosure relates generally to information handling systems, and more particularly to a failure recovery system for a switch.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some IHSs are configurable to include relatively complicated configurations that define how the IHS operates and/or communications with other IHSs in a network. For example, switches in a networked system may be configured with multiple configurations that define how the switch operates and/or communicates including, for example, a startup configuration that is stored in a non-volatile memory system and a running configuration that is stored in a volatile memory system. The failure of such switches raises a number of issues.

For example, in conventional switches, the startup configuration and/or the running configuration, as well as operating statistics, are lost any time the switch fails due to, for example, a corrupted memory system, failing hardware, and/or other failure issues known in the art. As such, following the failure of a switch in a networked system, a network administrator must replace or repair the switch (or replace/repair failed hardware and/or software in the switch) and then manually reconfigure the switch from scratch in order to recover from the failure of the switch. During that time, switch functionality is lost, which can prevent client devices from accessing the networked system.

Accordingly, it would be desirable to provide an improved failure recovery system for a switch.

SUMMARY

According to one embodiment, an information handling system (IHS) includes a chassis; a communication interface that is located in the chassis and that is configured to couple to a backup device; a processing system that is located in the chassis and that is coupled to the communication interface; and a memory system that is located in the chassis, coupled to the processing system, and that includes instructions that, when executed by the processing system, cause the processing system to provide a failure detection and response engine that is configured to: store a first configuration of the IHS in the memory system; detect a failure issue associated with an imminent failure of the IHS; retrieve the first configuration from the memory system; and send the first configuration through the communication interface to the backup device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
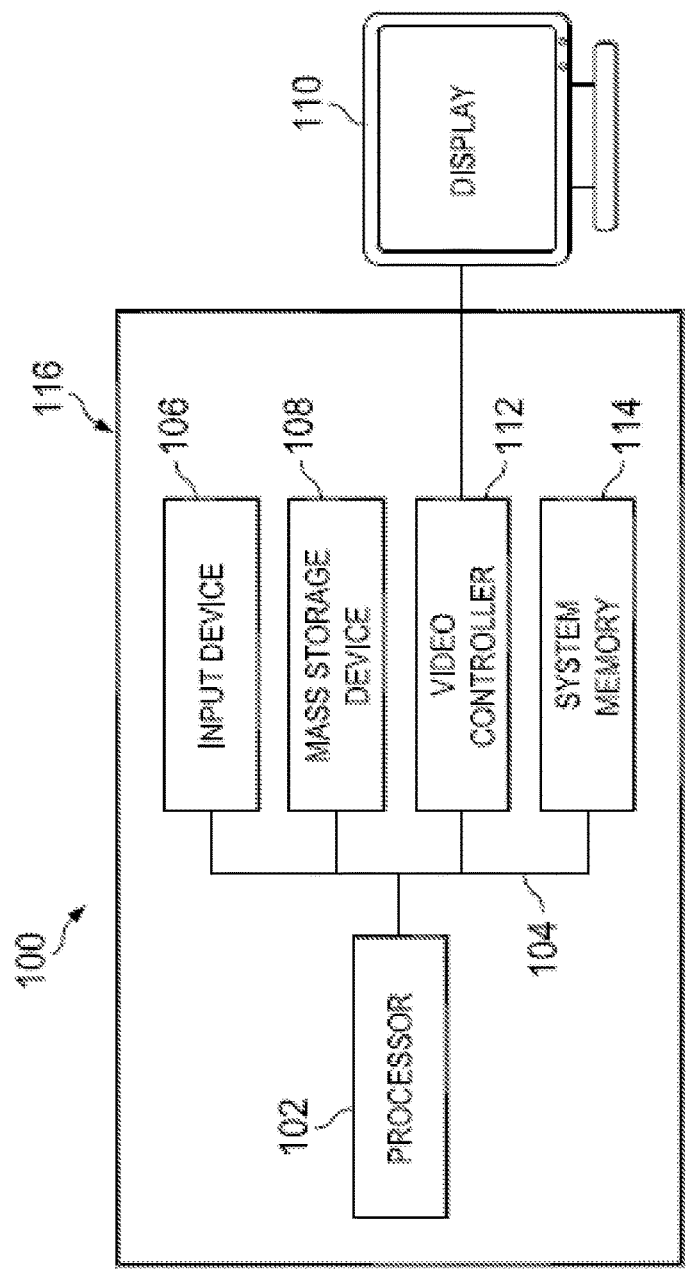
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
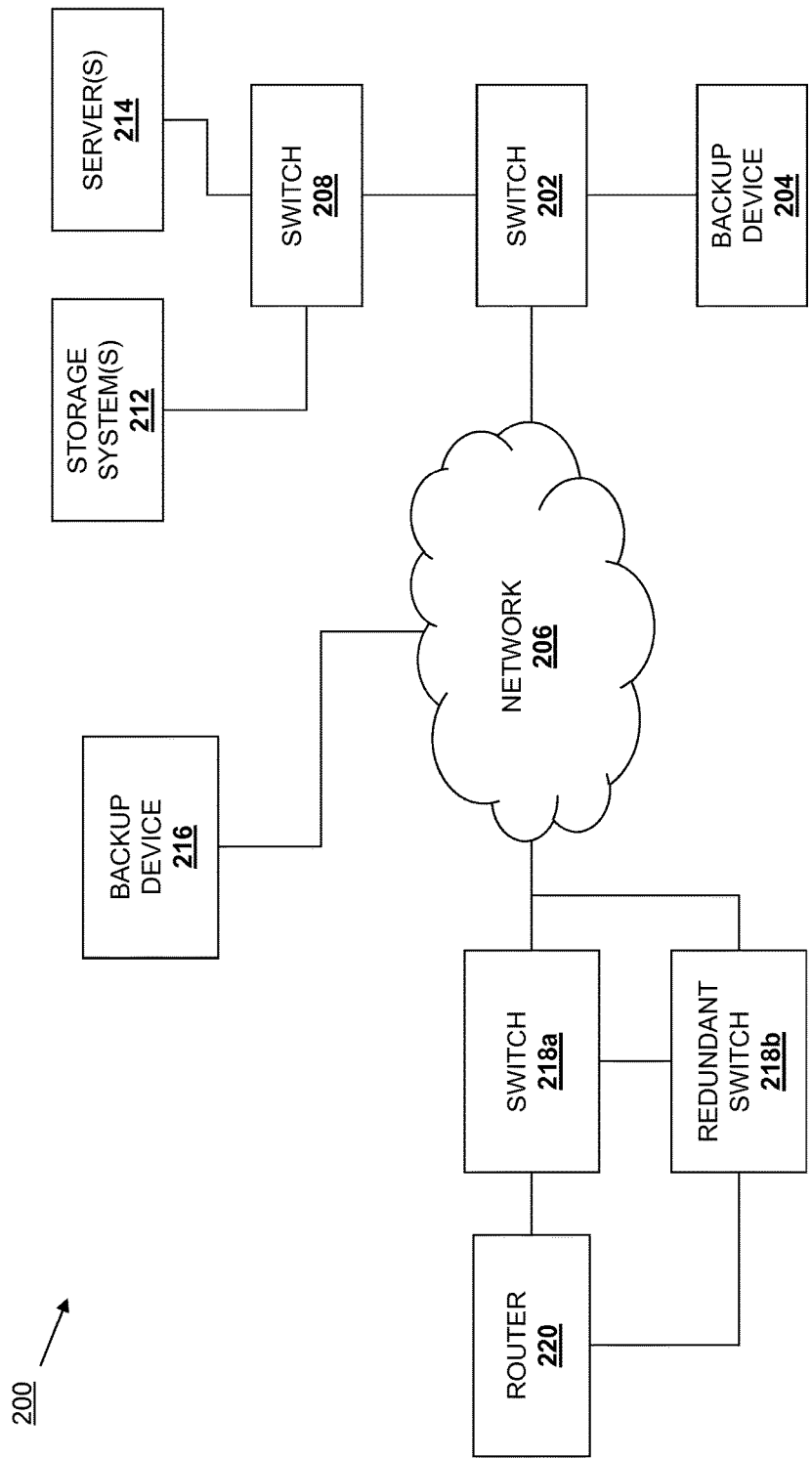
FIG. 2 is a schematic view illustrating an embodiment of a networked system.

Referring now to FIG. 2, an embodiment of a failure recovery system that, in the specific example provided below is a switch failure recovery system 200, is illustrated. The switch failure recovery system 200 includes a switch 202 that may be the IHS 100 discussed above with reference to FIG. 1 and/or that may include some or all of the components of the IHS 100. In the illustrated embodiment, the switch 202 is directly coupled to a backup device 204 (e.g., through a device connector port such as a Universal Serial Bus (USB) port, a storage device connector port, or other direct/non-networking connector port known in the art), as well as to a network 206 and a switch 208 (e.g., through networking connector ports such as Ethernet ports or other networking ports known in the art) that is connected to one or more storage systems 212 and one or more server(s) 214 (e.g., in a storage and/or server rack). Any or all of the backup device 204, the switch 208, the server(s) 214, and the storage system(s) 212 may be the IHS 100 discussed above with reference to FIG. 1 and/or that may include some or all of the components of the IHS 100. A backup device 216 is connected to the network 206 (e.g., through networking connector ports such as Ethernet ports or other networking ports known in the art), and may be the IHS 100 discussed above with reference to FIG. 1 and/or that may include some or all of the components of the IHS 100. A switch 218a and a redundant switch 218b are connected to the network 206, each other, and a router 220 (e.g., through networking connector ports such as Ethernet ports or other networking ports known in the art). Any or all of the switch 218a, the switch 218b, and the router 220 may be the IHS 100 discussed above with reference to FIG. 1 and/or that may include some or all of the components of the IHS 100.

In the embodiments discussed below, the failure of the switch 202 is discussed with regard to the functionality of the switch failure recovery system 200 in sending a configuration of the switch 202 to the backup device 204 and/or the backup device 216, and then providing that configuration to a new switch that is provided to replace the failed switch 202, to the switch 202 once it has recovered from the failure, and/or from the switch 218a to the redundant switch 218b. However, the functionality discussed below for the switch 202 may be provided for any configurable device in a networked system, including the switch 208, the storage system 212, the server 214, the switch 218a, the redundant switch 218b, and the router 220. Furthermore, the functionality discussed below for the backup devices 204 and/or 206 may be provided for any device in a networked system that includes storage or memory, including the switch 208, the storage system 212, the server 214, the switch 218a, the redundant switch 218b, and the router 220. As such, other switches, servers, storage system, routers, and/or other devices may provide the backup devices discussed below for the switch 202. Thus, while the failure recovery system is described below as a switch failure discovery system 200 that allows for the recovery from failures in switches using backup devices, in other embodiments, the teachings herein may be applied to recover from failures in of a variety of different configurable devices known in the art that are communicatively coupled to a device that includes a storage or memory system and that does not rely on the configurable device to function such that upon failure of the configurable device it may communicate with other devices.

Figure 3:
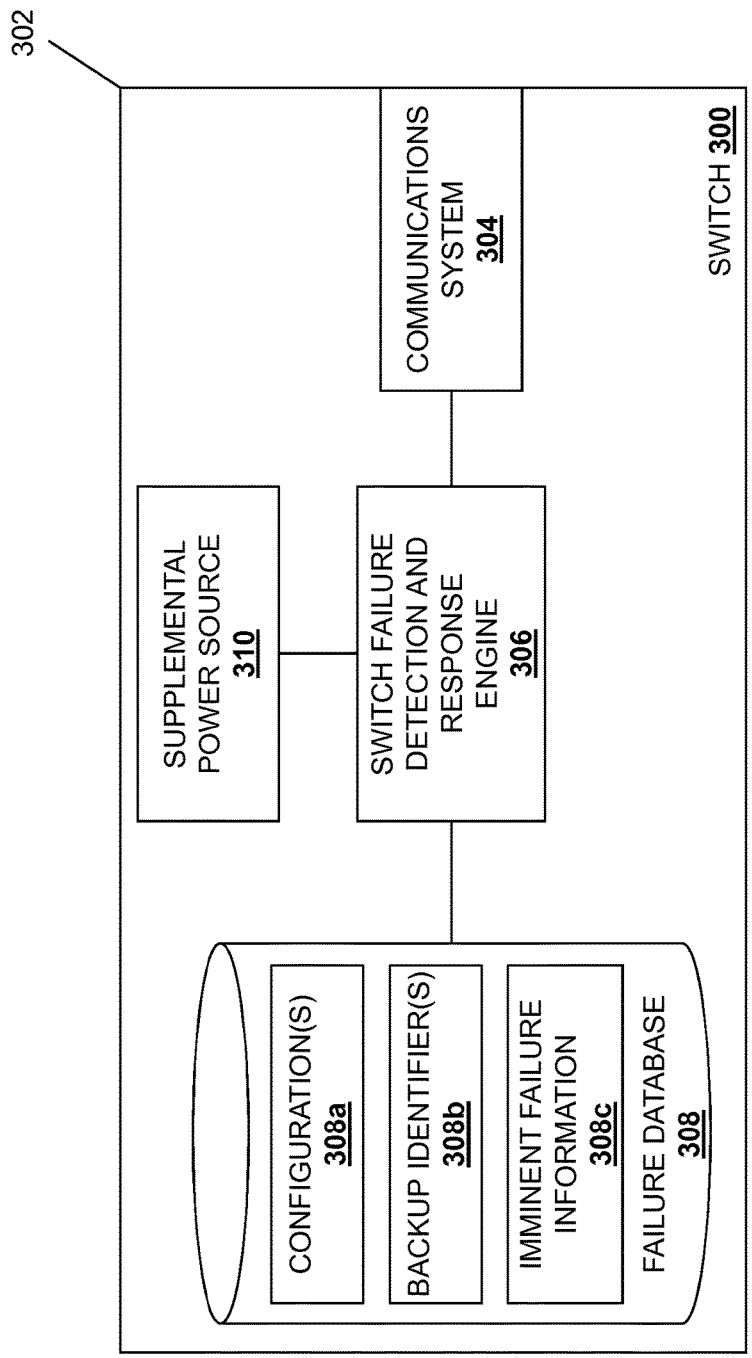
FIG. 3 is a schematic view illustrating an embodiment of a switch.

Referring now to FIG. 3, an embodiment of a switch 300 is illustrated that may be the IHS 100 discussed above with reference to FIG. 1 and/or that may include some or all of the components of the IHS 100. The switch 300 is primarily discussed below as being the switch 202 illustrated and described above with reference to FIG. 2. However, as discussed above, the components and/or functionality of the switch 300 may be provided in any or all of the switches in the switch failure recovery system 200, as well as in a variety of configurable devices known in the art while remaining within the scope of the present disclosure. The switch 300 includes a chassis 302, which may be the chassis 116 discussed above with reference to FIG. 1, that houses the components of the switch 300, only some of which are illustrated in FIG. 3. In the illustrated embodiment, a communication system 304 is housed in the chassis 302 of the switch 300, and may include physical communication interfaces such as, for example, network ports, device ports, antennas, and/or a variety of other physical communication interface known in the art, communication components such as a network interface controller (NIC), a wireless communication device (e.g., a Wi-Fi communication device, a Bluetooth communication device, and/or other wireless communication devices known in the art), and/or other communication components known in the art, and/or any other components known in the art that provide the functionality of the communication systems discussed below.

The chassis 302 of the switch 300 may also house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a switch failure detection and response engine 306 that is configured to perform the functions of the switch failure detection and response engines and switches discussed below. In some embodiments, the processing system that is used to provide the switch failure detection and response engine 306 may be a separate processing system from the processing system that used to provide the conventional functionality of the switch 300 such that, in the event of a failure of the processing system that provides the conventional functionality of the switch 300, the functionality of the switch failure detection and response engine 306 is enabled. However, in other embodiments, the same processing system may provide the functionality of the switch failure detection and response engine 306 and the conventional functionality of the switch 300.

The switch failure detection and response engine 306 is coupled to the communication system 304 (e.g., through a bus connecting the processing system to a communication component in the communication system 304). A failure database 308 is coupled to the switch failure detection and response engine 306 (e.g., through a bus connecting a memory or storage system that includes the failure database 308 to the processing system). In the illustrated embodiment, the failure database 308 is configured to store one or more configurations 308a, one or more backup identifiers 308b, imminent failure information 308c, and/or other information discussed in further detail below. In the illustrated embodiment, a supplemental power source 310 is housed in the chassis 302 of the switch 300, and may include a battery, capacitor, or other power storage device that may be utilized to allow for the sending of the configuration(s) 308a, failure log information 308c, and/or other information in a failure package subsequent to a loss of power that prevents the switch from operating and/or communicating with other devices in the switch failure recovery system 200 as discussed below. However, in some embodiments, the supplemental power source 310 may be omitted. While a specific switch 300 with specific components is illustrated and described herein, one of skill in the art will recognize that switches may include a variety of different components that are not illustrated or discussed herein while remaining within the scope of the present disclosure.

Figure 4:
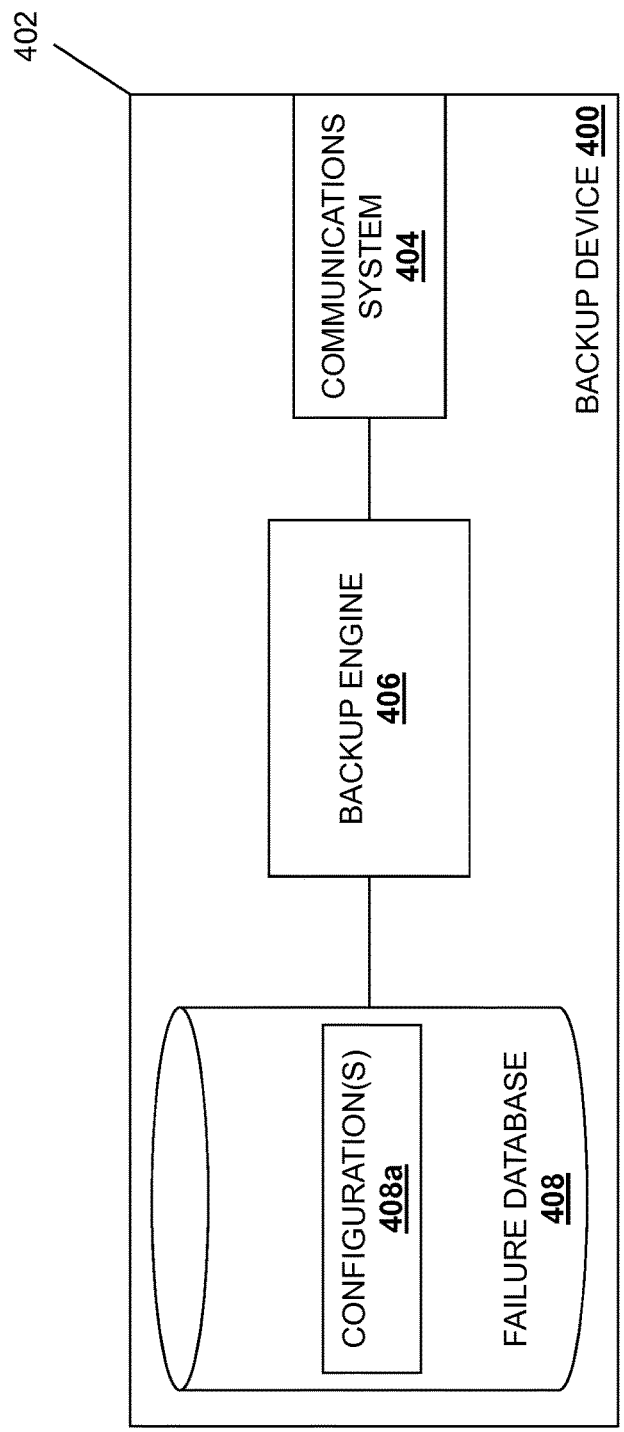
FIG. 4 is a schematic view illustrating an embodiment of a backup device.

Referring now to FIG. 4, an embodiment of a backup device 400 is illustrated that may be the IHS 100 discussed above with reference to FIG. 1 and/or that may include some or all of the components of the IHS 100. The backup device 400 is discussed below in several embodiment as being a standalone device such as the backup devices 204 and 216 illustrated and described above with reference to FIG. 2. However, as discussed above, the components and/or functionality of the backup device 400 may be provided in a variety of networked and/or others devices known in the art while remaining within the scope of the present disclosure. The backup device 400 includes a chassis 402, which may be the chassis 116 discussed above with reference to FIG. 1, that houses the components of the backup device 400, only some of which are illustrated in FIG. 4. In the illustrated embodiment, a communication system 404 is housed in the chassis 402 of the backup device 400, and may include physical communication interfaces such as, for example, network ports, device ports, antennas, and/or a variety of other physical communication interface known in the art, communication components such as a network interface controller (NIC), a wireless communication device (e.g., a Wi-Fi communication device, a Bluetooth communication device, and/or other wireless communication devices known in the art), and/or other communication components known in the art, and/or any other components known in the art that provide the functionality of the communication systems discussed below.

The chassis 402 of the backup device 400 may also house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a backup engine 406 that is configured to perform the functions of the backup engines and backup devices discussed below. The backup engine 406 is coupled to the communication system 404 (e.g., through a bus connecting the processing system to a communication component in the communication system 404). A failure database 408 is coupled to the backup engine 406 (e.g., through a bus connecting a memory or storage system that includes the failure database 408 to the processing system). In the illustrated embodiment, the failure database 408 is configured to store one or more configurations 408a, discussed in further detail below. While a specific backup device 400 with specific components is illustrated and described herein, one of skill in the art will recognize that backup devices may include a variety of different components that are not illustrated or discussed herein while remaining within the scope of the present disclosure.

Figure 5:
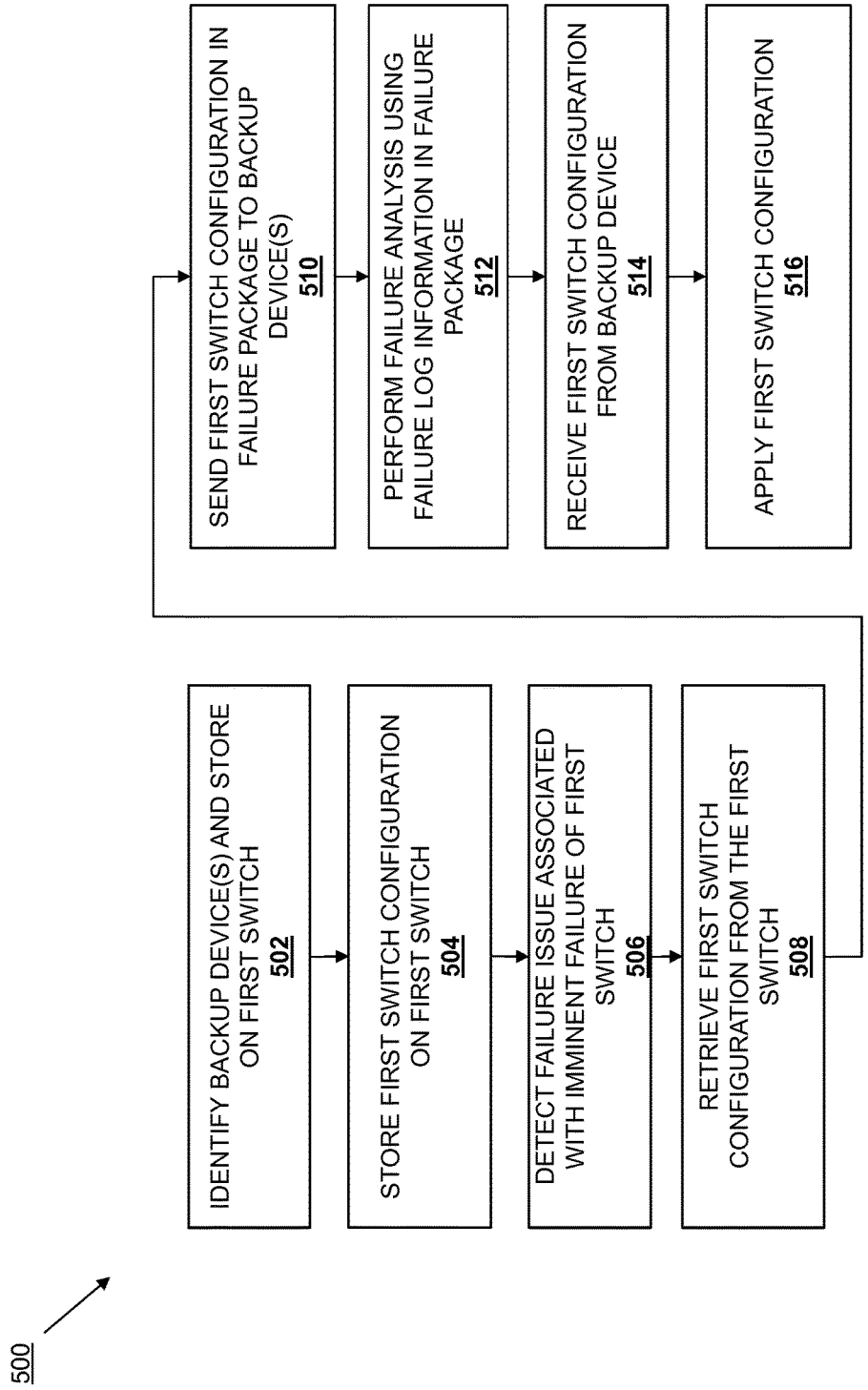
FIG. 5 is a flow chart illustrating an embodiment of switch failure recovery method.

Referring now to FIG. 5, an embodiment of a switch failure recovery method 500 is illustrated. As discussed in further detail below, the systems and methods of the present disclosure provide a switch that is configured to determine that it is going to experience an imminent failure that will result in its inability to operate, communicate with other devices, and/or otherwise perform its normal functions and, in response, send a failure package to a backup device that may include switch configuration(s), failure log information, and/or other information collected by the switch prior to failure. As discussed above, following the failure of a switch in a conventional networked system (e.g., due to a power failure, corrupted flash, bad hardware, etc.), current configuration data and operating data is lost with no way to recover it, and a network administrator must replace or repair the switch (or failed hardware in the switch) and then manually reconfigure the switch from scratch in order to recovery from the failure of the switch, and during that time, switch functionality is lost, which can prevent client devices from accessing the networked system. The systems and methods of the present disclosure provide for sending the current configuration (as well as other configurations in some embodiments) of the failing switch to the backup device, which may be a dedicated backup device, another switch, or other devices connected to the network. As discussed above, when the failed switch recovers or is replaced by a new switch, when the backup device is included in or coupled to a redundant switch, or in other scenarios discussed below, the configuration is provided to the recovered, replacement, or redundant switch and may be used to automatically configure that switch so that the network administrator does not need to manually configure that switch, which reduces the amount of time switch functionality is lost and client devices are prevented from accessing the networked system.

The method 500 begins at block 502 where one or more backup devices are identified and the identity of those backup device(s) is stored on a first switch. In an embodiment, a user or network administrator may identify one or more backup devices (e.g., the backup device 204, the backup device 216, and/or other devices in the switch failure recovery system 200) by providing backup device identification information to the switch 202/300. Identification of backup device(s) at block 502 may include the provision (via input devices, a file transfer, and/or other information transfer methods known in the art) of backup device identification information such as, for example, Media Access Control (MAC) addresses, Internet Protocol (IP) addresses, and/or other device identifiers known in the art to the switch 202/300. In response to receiving the device identifier(s) or other backup device identification information for the backup device at block 502 (e.g., through the communications system 304), the switch failure detection and response engine 306 in the switch 202/300 stores the backup device identification information as the backup identifier(s) 308b in the failure database 308. In other embodiments, backup device(s) identified and stored on the switch 202/300 may be default backup devices provided by a switch manufacturer, and backup device identification information may include instructions that allow the switch 202/300 to determine a backup device in the event an imminent failure is detected, discussed in further detail below.

The method 500 then proceeds to block 504 where a first switch configuration is stored on the first switch. In an embodiment, the switch 202 may be configured by a user or network administrator with a startup configuration, a running configuration, and/or a variety of other configurations known in the art. As is known in the art, a startup configuration file (sometimes referred to as a startup configuration) is typically stored on a non-volatile Random Access Memory (NVRAM) such that the startup configuration persists when the switch is powered off. When the switch is powered on and boots up, it copies the startup configuration to a volatile RAM and uses that copy to configure itself. The copy of the startup configuration in the volatile RAM that is used to configure the switch is referred to as the running configuration. When a user or network administrator makes a change to the running configuration (e.g., using a Command Line Interface (CLI)), the running configuration is modified, and the modified running configuration is active (e.g., implemented by the switch) as soon as the change is made. However, the modification to the running configuration is not applied to the startup configuration unless the user or network administrator instructs the switch to do so (e.g., using a "write memory" command). As such, if the switch is powered off or rebooted before the modifications to the running configuration have been applied to the startup configuration, those modification are lost (i.e., due to the running configuration being stored in a volatile RAM) and the switch will use the unmodified startup configuration upon reboot.

In some embodiments, upon a startup configuration being provided and stored in a NVRAM, or a running configuration being saved as a startup configuration in the NVRAM, the switch failure detection and response engine 306 may store that startup configuration as the configuration(s) 308a in the failure database 308. In some embodiments, upon the startup configuration being copied to a volatile RAM as a running configuration, or a modification being made to the running configuration in the volatile RAM, the switch failure detection and response engine 306 may store that running configuration as the configuration(s) 308a in the failure database 308. In some embodiments, the memory or storage system that includes failure database 308 in which the configuration(s) 308a are stored may be same storage or memory systems discussed above for storing the startup configuration (i.e., the NVRAM) and the running configuration (i.e., the volatile RAM), while in other embodiments, the memory or storage system that includes failure database 308 in which the configuration(s) 308a are stored may be different storage or memory systems that are separate from those discussed above for conventionally storing the startup configuration (i.e., the NVRAM) and the running configuration (i.e., the volatile RAM). Thus, in some embodiments, the failure database 308 may be provided on a storage or memory system that is different from the conventional storage or memory systems that typically store the startup configuration and running configuration. As discussed below, one of skill in the art in possession of the present disclosure will recognize that the use of the switch failure recovery system 200 with running configurations provide particular benefits over conventional systems due to the loss of the running configuration in the event of a switch failure in conventional systems. However, the use of the switch failure recovery system 200 with startup configurations, as well as configurations and configuration files for other devices known in the art, will fall within the scope of the present disclosure.

The method 500 then proceeds to block 506 where a failure issue associated with an imminent failure of the first switch is detected. In an embodiment, the switch failure detection and response engine 306 detects a failure issue that is associated with the imminent failure of the switch 300. As discussed below, the failure issue may be detected when an operating parameter of the switch 300 is outside of a predetermined range that indicates that the switch 300 will be unable to operate, communicate with other devices, and/or otherwise perform its normal functions following a relatively short period of time that one of skill in the art in possession of the present disclosure will understand may vary depending on the system.

For example, that relatively short period of time may range from fractions of a second (e.g., a minimum amount of time needed to send the imminent failure message discussed below, an amount of time that is insufficient to send the imminent failure message discussed below without the supplemental power source 310, etc.), to periods between 1 and 10 seconds depending on the system. In some embodiments, the time range associated with the relatively short period of time may be configured manually by the user. In other embodiments, the time range associated with the relatively short period of time may be automatically adjusted by the switch 202/300 based on the hardware configuration of the switch 202/300 that may include, for example, the types and number of power supplies, the types and numbers of fans, the number and types of devices connected to the switch 202/300, the current and/or average power supply usage over time, the current and/or average hardware temperature readings over time, the type of data traffic travelling through the switch 202/300, the subscriber devices and/or users connected to the switch 202/300, and/or a variety of other hardware configuration characteristics known in the art. While a number of examples of failures issues associated with an imminent failure are provided below, those examples are not meant to be limiting, and one of skill in the art will recognize that other failure issues associated with an imminent failure will fall within the scope of the present disclosure.

In one embodiment of block 506, the failure issue is detected in response to the switch failure detection and response engine 306 determining that a power amount provided by a power source (not illustrated) to the switch 202/300 and/or its components is outside of a predetermined power range. For example, the imminent failure information 308c in the failure database 308 may include one or more predetermined power ranges that are indicative of normal power amounts received during normal operation of the switch 202/300, and at block 506 the switch failure detection and response engine 306 may monitor the power amount provided to the switch 202/300 and/or one or more of its components to determine whether that power amount is outside of the predetermined power range(s) in the imminent failure information 208c. As such, at block 506, the switch failure detection and response engine 306 may determine that a power amount provided to the switch 202/300 or one of its components is below (or about to decrease below) a power amount that is necessary to sufficiently power the switch 202/300 or one of its components such that failure (e.g., insufficient power for the switch 202/300 to operate and/or communicate) is imminent. Similarly, at block 506, the switch failure detection and response engine 306 may determine that a power amount provided to the switch 202/300 or one of its components is above (or is about to increase above) a power amount that the switch 202/300 or one of its components is capable of handling such that failure (e.g., component damage that prevents the operation and/or communication of the switch 202/300) is imminent. As such, predetermined power ranges may be directed to an input power received by the switch 202/300 and/or input power received by one or more components in the switch 202/300 (e.g., a power supply unit, a processing system, etc.), and may be used to detect failure issues associated with the switch 202/300 receiving too much or too little power as a result of, for example, a failing power supply.

In another embodiment of block 506, the failure issue is detected in response to the switch failure detection and response engine 306 determining that a temperature of the switch 202/300 and/or its components is outside of a predetermined temperature range. For example, the imminent failure information 308c in the failure database 308 may include one or more predetermined temperature ranges that are indicative of normal operating temperatures of the switch 202/300, and at block 506 the switch failure detection and response engine 306 may monitor the temperature of the switch 202/300 and/or one or more of its components to determine whether that temperature is outside of the predetermined temperature range(s) in the imminent failure information 308c. As such, at block 506, the switch failure detection and response engine 306 may determine that a temperature of the switch 202/300 or one of its components is below (or is about to decrease below) a temperature that will affect the operation of the switch 202/300 or one of its components such that failure (e.g., inability of the switch 202/300 to operate and/or communicate due to low temperature) is imminent. Similarly, at block 404, the switch failure detection and response engine 306 may determine that a temperature of the switch 202/300 or one of its components is above (or about to increase above) a temperature that the switch 202/300 or one of its components is capable of handling such that failure (e.g., inability of the switch 202/300 to operate and/or communicate due to high temperature) is imminent. As such, predetermined temperature ranges may be directed to temperatures experienced by the switch 202/300 and/or one or more components in the switch 202/300 (e.g., a processing system, a memory system, etc.), and may be used to detect failure issues associated with the switch 202/300 experiencing extreme temperatures as a result of, for example, a failing thermal control system.

In another embodiment of block 506, the failure issue is detected in response to the switch failure detection and response engine 306 determining that a hardware resource parameter of the switch 202/300 and/or its components is outside of a predetermined hardware resource parameter range. For example, the imminent failure information 308c in the failure database 308 may include one or more predetermined hardware resource parameter ranges that are indicative of hardware resource parameters for hardware resources in the switch 202/300, and at block 506 the switch failure detection and response engine 306 may monitor the hardware resource parameters of the hardware resources in the switch 202/300 and/or one or more of its components to determine whether any of those hardware resource parameters are outside of the predetermined hardware resource parameter range(s) in the imminent failure information 308c. As such, at block 506, the switch failure detection and response engine 306 may determine that a hardware resource parameter of the switch 202/300 or one of its components is outside (or is about to begin operating outside) a hardware resource parameter range that will affect the operation of the switch 202/300 or one of its components such that failure (e.g., inability of the switch 202/300 to operate and/or communicate due to corruption of the memory system in the switch 202/300, reduced capability of the memory system in the switch 202/300, overuse of the processing system in the switch 202/300, etc.) is imminent. As such, predetermined hardware resource parameter ranges may be directed to hardware resources in the switch 202/300 and/or one or more components in the switch 202/300 (e.g., the memory system, the processing system, etc.), and may be used to detect failure issues associated with the inability (or reduced ability) of the switch 202/300 to operate due to degraded hardware resources.

In another embodiment of block 506, the failure issue is detected in response to the switch failure detection and response engine 306 determining that a software resource parameter of the switch 202/300 and/or its components is outside of a predetermined software resource parameter range. For example, the imminent failure information 308c in the failure database 308 may include one or more predetermined software resource parameter ranges that are indicative of software resource parameters for software resources in the switch 202/300, and at block 506 the switch failure detection and response engine 306 may monitor the software resource parameters of the software resources in the switch 202/300 and/or one or more of its components to determine whether any of those software resource parameters are outside of the predetermined software resource parameter range(s) in the imminent failure information 308c. As such, at block 506, the switch failure detection and response engine 306 may determine that a software resource parameter of the switch 202/300 or one of its components is outside (or is about to begin operating outside) a software resource parameter range that will affect the operation of the switch 202/300 or one of its components such that failure (e.g., inability of the switch 202/300 to operate and/or communicate due to an operating system shutdown, an application failure, basic input output system (BIOS) corruption, etc.) is imminent. As such, predetermined software resource parameter ranges may be directed to software resources in the switch 202/300 and/or one or more components in the switch 202/300 (e.g., the operating system, an application, the BIOS, etc.), and may be used to detect failure issues associated with the inability (or reduced ability) of the switch 202/300 to operate due to degraded software resources.

Thus, the failure issue detected at block 506 may include a variety of failure issues that will result in an imminent failure that prevents the first switch from operating, communicating, and/or performing its normal functions. In addition to the failure issues expressly detailed above, a wide variety of other failure issues will fall within the scope of the present disclosure, including user-defined shutdown ranges that include user-defined parameters that indicate when the switch 202/300 is operating at a user-defined sub-par level, when the switch 202/300 is about to experience a software upgrade such that it will be unavailable for some period of time, etc. Furthermore, failures of the operating system in the switch, configuration changes to the switch that inhibit the switch from operating and/or communicating, and/or a variety of other failures issues will fall within the scope of the present disclosure. One of skill in the art will recognize that the failure issues detailed above may result in the loss of one or more configurations that are stored on, applied to, or otherwise utilized by the switch, and/or an inability of the switch to operate, communicate, or otherwise perform switching functions known in the art.

The method 500 then proceeds to block 508 where the first switch configuration is retrieved from the first switch. In an embodiment, the switch failure detection and response engine 306 retrieves one or more of the configuration(s) 308a that are stored in the failure database 308. As discussed above, the configuration(s) 308a stored in the failure database 308 may include a startup configuration, a running configuration, and/or other configurations known in the art, and at block 508, the switch failure detection and response engine 306 retrieves the startup configuration, the running configuration, and/or the other configuration.

The method 500 then proceeds to block 510 where the first switch configuration is sent in a failure package to one or more backup devices. In some embodiments of block 510, a failure package may be created that includes the first switch configuration as well as other data, while in other embodiments, the first switch configuration may be the only data sent in the failure package (i.e., the first switch configuration is the failure package). In some embodiments, the failure package is created by the switch failure detection and response engine 306 in response to detecting the failure issue at block 506. In some embodiments, the failure package may have been at least partially created by the switch failure detection and response engine 306 prior to detecting the failure issue at block 506. As such, in some embodiments block 510 may be performed prior to block 506, while in some embodiments block 510 may be at least partially performed subsequent to block 506. For example, the failure package may be entirely created prior to detecting the failure issue at block 506. In another example, the failure package may be partially created prior to detecting the failure issue at block 506, and then completed subsequent to detecting the failure issue at block 506. In yet another example, the failure package may be entirely created subsequent to detecting the failure issue at block 506.

As discussed above, the failure package created at block 510 may only include the configuration(s) retrieved from the switch 202/300 at block 508, which may include the startup configuration, the running configuration, and/or the other configurations discussed above, as well as any other information that may be used to configure a switch to operate as the switch 202/300 operated prior to a failure that results from the failure issue. However, in some embodiments, the failure package created at block 510 may also include failure log information that may be stored in the failure database 308 (e.g., by the switch failure and response engine 306) and that may include any information associated with events (e.g., detected by the switch failure and response engine 306) prior to the detection of the imminent failure of the switch 202/300 and/or up to the sending of the failure package, time information for each of those events, and/or a variety of other failure log information known in the art. In an embodiment, the failure package created at block 510 may also include a first identifier for the switch 202/300. For example, an identifier for the switch 202/300 may include an Internet Protocol (IP) address for the switch 202/300, a Media Access Control (MAC) address for the switch 202/300, and/or a variety of other IHS identifiers known in the art. One example of the performance of block 510 to entirely create the failure package prior to block 506 may include a failure package that only includes the running configuration for the switch 202/300 (i.e., including any modifications available prior to detecting the failure issue at block 506), although such an example may include other information that is available prior to detecting the failure issue at block 506.

Thus, at block 510 a failure package may be created that may include a variety of information that allowed the switch 202/300 to operate as it did prior to failure and that is associated with events prior to the failure of the switch 202/300. While several examples have been provided, one of skill in the art in possession of the present disclosure will recognize that any of a variety of failure information, switch information, and/or other information may be included in the failure package while remaining within the scope of the present disclosure. In addition, a hierarchy or prioritization may be provided in the imminent failure information 308c in the failure database 308 that details which information is to be included in the failure package depending on how imminent (e.g., the amount of time until) the failure, and thus some failure issues may allow more information to be included in the failure package than others.

In an embodiment, block 510 also includes determining one or more backup devices to which the failure package will be sent. For example, the switch failure detection and response engine 306 may retrieve the backup identifier(s) 308b stored in the failure database, and use those backup identifier(s) to send the failure package (or just the first switch configuration) through the communication system 304 to the backup device(s) identified by those backup identifier(s). As discussed above, the backup identifier(s) may include backup device identification information that explicitly identifies the backup device(s) (e.g., the backup device 204, the backup device 216, and/or other devices in the switch failure recovery network 200), and the switch failure detection and response engine 306 may use those backup identifier(s) to send the failure package to those backup device(s). In an embodiment, the switch failure detection and response engine 306 may send a unicast packet to each backup device identified by a backup identifier. In some examples, a single backup identifier may be retrieved and used to send a single unicast packet including the failure package or first switch configuration to a single backup device. As also discussed above, in some embodiments the backup device identification information may include instructions that allow the switch 202/300 to determine backup device(s), and at block 510 the switch failure detection and response engine 306 may execute those instructions to determine one or more backup device(s) to which to send the failure package, and then send the failure package to those backup device(s). For example, instructions for sending a failure package to backup device(s) may include instructions to send the failure package to a backup device determined to be directly connected to the switch 202/300 (e.g., the backup device 204), instructions to send the failure package to a backup device that is coupled to a different power source or infrastructure (e.g., the backup device 216), instructions to send a multi-cast packet including the failure package to a plurality of backup devices, and/to a variety of other instructions known in the art.

In some embodiments, the switch failure detection and response engine 306 may use the failure issue detected at block 506 to determine a time period available to send the failure package prior to the imminent failure of the switch 202/300, and send the failure package at block 510 prior to the expiration of that time period. In some embodiments, the switch failure detection and response engine 306 may include components that allow for the sending of the failure package at block 510 subsequent to the imminent failure that would otherwise prevent the switch 202/300 from operating and/or communicating. For example, for failure issues such as degrading power supply, the supplemental power source 310 (e.g., a battery, capacitor, or other power storage device) may be utilized to allow the switch failure detection and response engine 306 to send the failure package subsequent to a loss of power that would otherwise prevent the switch 202/300 from operating and/or communicating. Following the sending of the failure package, the switch 202/300 may fail and, as such, cease operating, communication, and/or performing its normal functions.

The method 500 may then proceed to block 512 where a failure analysis is performed using the failure log information in the failure package. In an embodiment, a failure analysis subsystem (e.g., in the backup device, including the backup device, or coupled to the backup device through the network) may retrieve the failure log information and/or other information from the failure package sent to the backup device at block 510, and use that failure log information to de-bug, analyze, and/or otherwise determine the cause of the failure of the switch 202/300. The failure analysis performed by the failure analysis subsystem at block 510 using the failure log information may include review and analysis of event logs, alarm information, alarm codes, configuration data related to the error, and/or a variety of other failure analysis actions known in the art. However, in some embodiments, block 512 of the method 500 may be skipped.

The method 500 then proceeds to block 514 where the first switch configuration is received from the backup device. In an embodiment, the first switch configuration (e.g., the configuration sent from the switch 202/300 prior to failure) that was sent to the backup device at block 510 may subsequently be provided to any switch that is connected to that backup device directly and/or through the network 206. In one example, the switch 202 that failed may be replaced with a new switch, and at block 514 the backup device may provide to the new switch, and/or the new switch may retrieve from the backup device, the configuration(s) that were sent to the backup device at block 510. For example, upon being coupled to the backup device (e.g., directly or through the network 206), the backup engine 406 in the backup device 400 may detect the new switch (e.g., using discovery packets or other discovery methods known in the art), determine that the new switch is replacing the failed switch 202/300 and, in response, send the configuration(s) received at block 510 to the new switch. In another example, upon being coupled to the backup device (e.g., directly or through the network 206), the new switch may identify the backup device as storing the previously configuration of the failed switch 202/300 and, in response, retrieve the configuration(s) sent at block 510 to the backup device. While a few examples have been described, one of skill in the art in possession of the present disclosure will recognize that the new switch and the backup device may perform a variety of discovery and communication techniques known in the art to initiate the sending of the configuration from the backup device to the new switch.

In another example, the switch 202 that failed may be repaired or may otherwise recover from the failure, and at block 514 the backup device may provide to the recovered switch 202/300, and/or the recovered switch 202/300 may retrieve from the backup device, the configuration(s) that were sent to the backup device at block 510. For example, upon recovery of the switch 202/300 from the failure, the backup engine 406 in the backup device 400 may detect the recovered switch 202/300 (e.g., using communication methods known in the art) and, in response, send the configuration(s) received at block 510 to the recovered switch 202/300. In another example, upon recovery from the failure, the recovered switch 202/300 may identify the backup device as storing the previously configuration of the recovered switch 202/300 and, in response, retrieve the configuration(s) sent at block 510 to the backup device. In another example, the configuration may be transferred from the backup device to the recovered switch 202/300 manually by a user via, for example, a Universal Serial Bus (USB) storage device or other portable storage devices known in the art. As such, the switch failure and response engine 306 may determine that the switch 202/300 has recovered following the failure and receive or retrieve the configuration through the communications system 304. While a few examples have been described, one of skill in the art in possession of the present disclosure will recognize that the recovered switch 202/300 and the backup device may perform a variety of discovery and communication techniques known in the art to initiate the sending of the configuration from the backup device to the recovered switch 202/300.

In another example, the failed switch may be the switch 218a, the backup device may be included in or coupled to a redundant switch 218b, and at block 514 the backup device may provide to the redundant switch 218b, and/or the redundant switch 218b may retrieve from the backup device, the configuration(s) that were sent to the backup device at block 510. For example, upon receiving the configuration at block 510, the backup engine 406 in the backup device 400 may provide the configuration to the redundant switch 218b (e.g., simply by receiving the configuration when the backup device is included in the redundant switch 218b, by sending the configuration over the network to the redundant switch 218b, etc.). In another example, the redundant switch 218b may retrieve the configuration(s) sent at block 510 to the backup device (e.g., simply by the backup device receiving the configuration when the backup device is included in the redundant switch 218b, by retrieving the configuration over the network from the backup device, etc.). While a few examples have been described, one of skill in the art in possession of the present disclosure will recognize that the redundant switch 218b and the backup device may perform a variety of communication techniques known in the art to initiate the sending of the configuration from the backup device to the recovered switch 202/300.

Furthermore, while examples of new switches, recovered switches, and redundant switches being provided the configuration information sent to the backup device at block 510 have been described, other switches in the switch failure recovery system 200 may be provided the configuration sent to the backup device at block 510 while remaining within the scope of the present disclosure. For example, using the example of the failure of the switch 202 in the switch failure recovery system 200, the configuration sent to the backup device 216 at block 510 may then be provided to the switch 218a. As such, one of skill in the art in possession of the present disclosure will recognize that configurations sent to a backup device according to the method 500 may be sent to any of a variety of different devices based on any desired use of that configuration.

The method 500 then proceeds to block 516 where the first switch configuration is applied. In different embodiments, any switch in the switch failure recovery system 200 that receives the configuration from the backup device at block 514 may apply that configuration to itself. For example, the switch 300 may be the new switch discussed above that replaces the failed switch 202, and the switch failure detection and response engine 306 (or other configuration engine in the switch 300) may use the configuration received from the backup device to automatically configure the new switch (e.g., without user intervention or inputs) using configuration techniques known in the art. In another example, the switch 300 may be the recovered switch 202 discussed above that is repaired or otherwise recovers from a previous failure, and the switch failure detection and response engine 306 (or other configuration engine in the switch 300) may use the configuration received from the backup device to automatically configure the recovered switch 202 (e.g., without user intervention or inputs) using configuration techniques known in the art. In another example, the switch 300 may be the redundant switch 218b discussed above, and the switch failure detection and response engine 306 (or other configuration engine in the switch 300) may use the configuration received from the backup device to automatically configure the redundant switch 218b (e.g., without user intervention or inputs) using configuration techniques known in the art. As such, a new switch, recovered switch, redundant switch, and/or other switch may power up, boot, reboot, and/or otherwise initialize, receive the configuration information of the backup device, and automatically apply the configuration to itself.

While the switches have been discussed above as automatically applying the configurations received from the backup device, other embodiments may involve some user intervention or input in retrieving the configuration from the backup device and/or applying it to the switch. For example, a user may instruct the backup device to send the configuration to the switch, instruct the switch to retrieve the configuration from the backup device, instruct the switch to apply the configuration, and/or provide other minor inputs that result in the configuration being provided to and applied to the switch. However, embodiments including such minor inputs by a user still provide substantial benefits in time savings and effort expended in configuring a new switch, a recovered switch, a redundant switch, or other device relative to conventional systems that experience a switch failure.

Thus, systems and methods have been described that provide for the recovery from a failure of a switch by having a failing switch detect an imminent failure and send a failure package, "last breath" file, "dying gasp" file, or "tar ball" to an external device. That failure package may then subsequently be provided to and used to automatically configure a new switch that replaces the failed switch, a recovered switch that recovers from the failure, a redundant switch that was provided with the failed switch, and/or another switch in the network. As such, the failure of a switch in the network may be quickly and easily remedied such that switch functionality is restored and inability of client devices to access the networked system is minimized.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A switch failure recovery system, comprising:
a network;
a backup device that is coupled to the network; and
a first switch that is coupled to the network, that includes a first switch volatile memory system and a first switch non-volatile memory system, and that is configured to:
copy a startup configuration that is stored in the first switch non-volatile memory system to the first switch volatile memory system;
modify the startup configuration that was copied to the first switch volatile memory system to provide a running configuration that is stored on the first switch volatile memory system and that is different than the startup configuration that is stored on the first switch non-volatile memory system;
detect a failure issue associated with an imminent failure of the first switch; and
retrieve, in response to and subsequent to detecting the failure issue, the running configuration from the first switch volatile memory system and send that running configuration over the network to the backup device.

2. The switch failure recovery system of claim 1, wherein the first switch is configured to:
receive backup device identification information for the backup device;
store the backup device identification information; and
retrieve the backup device identification information in response to detecting the failure issue associated with the imminent failure of the first switch and use the backup device identification information to send the running configuration over the network to the backup device.

3. The switch failure recovery system of claim 1, wherein the backup device is included on a second switch that is coupled to the network.

4. The switch failure recovery system of claim 1, further comprising:
a second switch that is coupled to the network, wherein the second switch is configured to:
receive the running configuration from the backup device; and
apply the running configuration to the second switch.

5. The switch failure recovery system of claim 1, wherein running configuration is sent over the network to the backup device as part of a failure package that includes failure log information, and wherein the switch failure recovery system further comprises:
at least one failure analysis subsystem that is coupled to the backup device and that is configured to perform a failure analysis for the first switch using the failure log information.

6. The switch failure recovery system of claim 1, wherein the first switch is configured to:
initialize following a failure of the first switch due to the failure issue along with a subsequent recovery of the first switch from the failure issue;
receive the running configuration over the network from the backup device; and
apply the running configuration to the first switch.

7. The switch failure recovery system of claim 1, wherein the backup device is configured to:
send the running configuration over the network to at least one of:
the first switch following a failure of the first switch due to the failure issue along with a subsequent recovery of the first switch from the failure issue; and
a second switch that is coupled to the network.

8. An information handling system (IHS), comprising:
a chassis;
a communication interface that is located in the chassis and that is configured to couple to a backup device through a network;
a processing system that is located in the chassis and that is coupled to the communication interface; and
a memory system that includes a non-volatile memory subsystem and a volatile memory subsystem and that is located in the chassis, coupled to the processing system, and that includes instructions that, when executed by the processing system, cause the processing system to provide a failure detection and response engine that is configured to:
copy a first configuration of the IHS that is stored in the non-volatile memory subsystem to the volatile memory subsystem;
modify the first configuration that was copied to the volatile memory subsystem to provide a modified configuration that is stored on the volatile memory subsystem and that is different than the first configuration that is stored on the non-volatile memory subsystem;

detect a failure issue associated with an imminent failure of the IHS;

retrieve, in response to and subsequent to detecting the failure issue, the modified configuration from the volatile memory subsystem and send that modified configuration through the communication interface to the backup device.

9. The IHS of claim 8, wherein the failure detection and response engine is configured to:

receive backup device identification information for the backup device;

store the backup device identification information; and retrieve the backup device identification information in response to detecting the failure issue associated with the imminent failure of the IHS and use the backup device identification information to send the modified configuration over the network to the backup device.

10. The IHS of claim 8, wherein the failure detection and response engine is configured to:

retrieve the modified configuration from the non-volatile memory subsystem such that the modified configuration may be sent through the communication interface to the backup device.

11. The IHS of claim 8, further comprising:

a supplemental power source that is located in the chassis and that is configured to provide power to the failure detection and response engine following a failure of the IHS due to the failure issue.

12. The IHS of claim 8, wherein failure detection and response engine is configured to:

store failure log information in the memory system;

retrieve the failure log information from the memory system in response to detecting the failure issue associated with the imminent failure of the IHS; and send the failure log information along with the modified configuration through the communication interface to the backup device.

13. The IHS of claim 8, wherein the failure detection and response engine is configured to:

detect an initialization of the IHS following a failure of the IHS due to the failure issue along with a subsequent recovery of the IHS from the failure issue;

receive the modified configuration through the communication interface from the backup device; and apply the modified configuration to the IHS.

14. The IHS of claim 8, wherein the failure detection and response engine is configured to:

couple to a network through the communication interface;

receive a second configuration from the backup device; and apply the second configuration to the IHS.

15. A switch failure recovery method, comprising:

copying, by a first switch from a first switch non-volatile memory system to a first switch volatile memory system, a startup configuration;

modifying, by the first switch, the startup configuration that was copied to the first switch volatile memory system to provide a running configuration that is stored in the first switch volatile memory system and that is different than the startup configuration that is stored on the first switch non-volatile memory system;

detecting, by the first switch, a failure issue associated with an imminent failure of the first switch; and retrieving, by the first switch from the first switch volatile memory system in response to and subsequent to detecting the failure issue, the running configuration and sending that running configuration to a backup device.

16. The switch failure recovery method of claim 15, further comprising:

receiving, by the first switch, backup device identification information for the backup device;

storing, by the first switch, the backup device identification information; and retrieving, by the first switch, the backup device identification information in response to detecting the failure issue associated with the imminent failure of the first switch, and using the backup device identification information to send the running configuration over the network to the backup device.

17. The switch failure recovery method of claim 16, further comprising:

receiving, by a second switch, the running configuration from the backup device; and applying, by the second switch, the running configuration to the second switch.

18. The switch failure recovery method of claim 15, further comprising:

sending, by the first switch, the running configuration over the network to the backup device as part of a failure package that includes failure log information; and performing, by at least one failure analysis subsystem that is coupled to the backup device, a failure analysis for the first switch using the failure log information.

19. The switch failure recovery method of claim 18, further comprising:

initializing, by the first switch, following a failure of the first switch due to the failure issue along with a subsequent recovery of the first switch from the failure issue;

receiving, by the first switch, the running configuration over the network from the backup device; and applying, by the first switch, the running configuration to the first switch.

20. The switch failure recovery method of claim 15, further comprising:

sending, by the backup device, the running configuration over the network to at least one of:

the first switch following a failure of the first switch due to the failure issue along with a subsequent recovery of the first switch from the failure issue; and a second switch that is coupled to the backup device.

* * * * *